March 8, 1955

C. K. BIRCH 2,703,568

FURNACE GRATE ASSEMBLY

Filed Sept. 15, 1950

INVENTOR
Charles K. Birch
BY
ATTORNEYS

March 8, 1955  C. K. BIRCH  2,703,568
FURNACE GRATE ASSEMBLY
Filed Sept. 15, 1950  3 Sheets-Sheet 2

INVENTOR
Charles K. Birch
BY
ATTORNEYS

March 8, 1955   C. K. BIRCH   2,703,568
FURNACE GRATE ASSEMBLY

Filed Sept. 15, 1950   3 Sheets-Sheet 3

INVENTOR
Charles K. Birch
BY
ATTORNEYS

United States Patent Office 2,703,568
Patented Mar. 8, 1955

2,703,568

FURNACE GRATE ASSEMBLY

Charles K. Birch, Montclair, N. J., assignor to Lehigh Valley Coal Sales Company, New York, N. Y., a corporation of Delaware Application September 15, 1950, Serial No. 185,000

3 Claims. (Cl. 126—176)

This invention relates to furnace grates, and is particularly concerned with the provision of an ash crushing grate assembly which has been found to be particularly advantageous for use in coal fired furnaces equipped with vacuum (suction) ash removal systems.

Coal fired furnaces possess many advantages for heating purposes owing to their economy and efficiency. The manual removal of ashes from such furnaces is, however, an unpleasant task at best, and has mitigated against their use for domestic and light industrial heating purposes. In my copending application Serial No. 82,341, filed March 19, 1949, now Patent #2,685,480 I have described a new and very effective vacuum ash removal apparatus which performs the ash removal operation automatically, and quite completely overcomes the disadvantages incident to manual ash removal. In this and other vacuum ash removal systems, however, it is necessary that the ash discharged through the furnace grate be sufficiently finely divided so that it can be carried to the ash receptacle in the current of air induced by the suction fan. Very coarse ash and clinkers are too heavy to be swept through the suction system, and if such coarse and heavy particles pass through the furnace grate they are very likely to clog the suction pipes.

The present invention provides an improved ash crushing grate which permits passage through it only of such particles as are small enough in size to be removed easily and completely from the furnace pit (or ash hopper) by a suction system. Shaking the grate results in breaking up any coarse ash and clinkers to particles of the desired fineness before they can be discharged through the grate.

The new ash crushing grate assembly comprises a plurality of grate bars mounted side by side, each grate bar comprising a string of individual grate segments mounted non-rotatably on a supporting shaft. The grate segments each comprise a hub having an axial opening therethrough for receiving the supporting shaft, and a plurality of angularly spaced short fingers projecting radially therefrom. Each grate bar is mounted with the fingers of its grate segments projecting into the angular spaces between the fingers on the segments of the laterally adjacent grate bars. Preferably each segment in a string forming a single grate bar is staggered angularly with respect to its neighboring segments in the string so that its fingers are aligned with the spaces between the fingers of such neighboring segments.

A frame rotatably supports the grate bars in their spaced parallel relation to each other. The grate shafts are advantageously rectangular, and the axial openings through the grate segments are of the same cross-sectional shape, so as to prevent relative rotation between the shaft and segments forming a single bar. To enable the bar as a whole to rotate in the supporting frame, however, the end segments of each string are provided with cylindrical journals extending axially from the segment hub, which journals are received in corresponding cylindrical journal bearings formed in the frame.

The shafts of alternate grate bars project beyond the frame, and each of such projecting shafts is provided with a grate shaking lever. Preferably all of the grate shaking levers are pivotally linked together, so that oscillatory movement of any such lever results directly in corresponding oscillatory movement of the alternate grate bars. The intervening grate bars are then indirectly oscillated by virtue of the intermeshing of the fingers of the grate segments thereof with the fingers of the grate segments of the alternate grate bars.

When the grate above described is shaken by imparting oscillatory movement to the grate shaking levers, coarse ash and clinkers on the grate are broken up between the interengaging fingers of the grate segments, and thereby are reduced to particles of sufficiently small size for handling in a vacuum ash removal system before they are discharged through the grate.

Two advantageous embodiments of the new grate, one for circular furnaces such as are commonly used for domestic heating purposes, and the other for furnaces of rectangular plan, are described below with reference to the accompanying drawings, in which.

Figure 1:
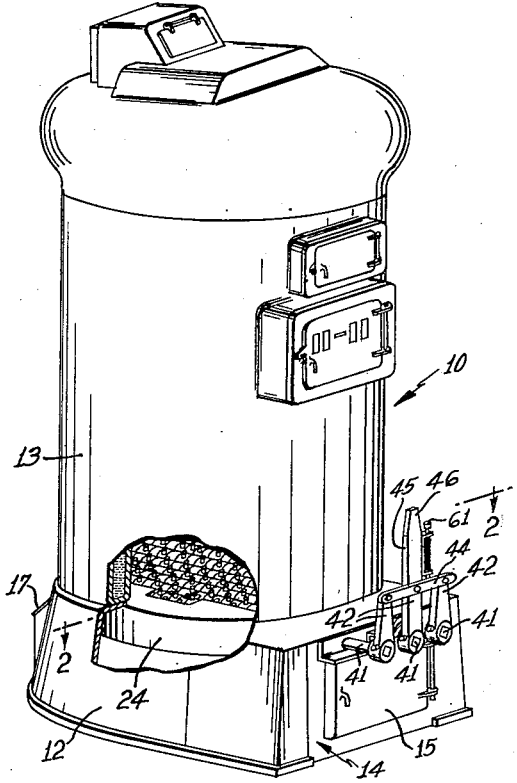
Fig. 1 is a perspective of a cylindrical furnace equipped with the new grate, a portion of the wall of the furnace being broken away to show the grate.

Fig. 1 shows a furnace 10 of a type commonly employed for domestic heating purposes equipped with a grate 11 made in accordance with the invention. The furnace 10 comprises a base 12 on which the cylindrical insulated heating jacket 13 of the furnace is mounted, and which also supports the grate 11 at the bottom of combustion chamber within the heating jacket. The space within the base 12, below the grate 11, forms the usual furnace ash pit, in which an ash hopper for a vacuum ash removal system can be mounted. The front portion 14 of the furnace base 12 projects somewhat beyond the furnace heating jacket and is squared off to accommodate the usual ash pit door 15, the grate shaking assembly, etc. The furnace of Fig. 1 is shown with its bottom draft door 17 at the rear.

Figure 2:
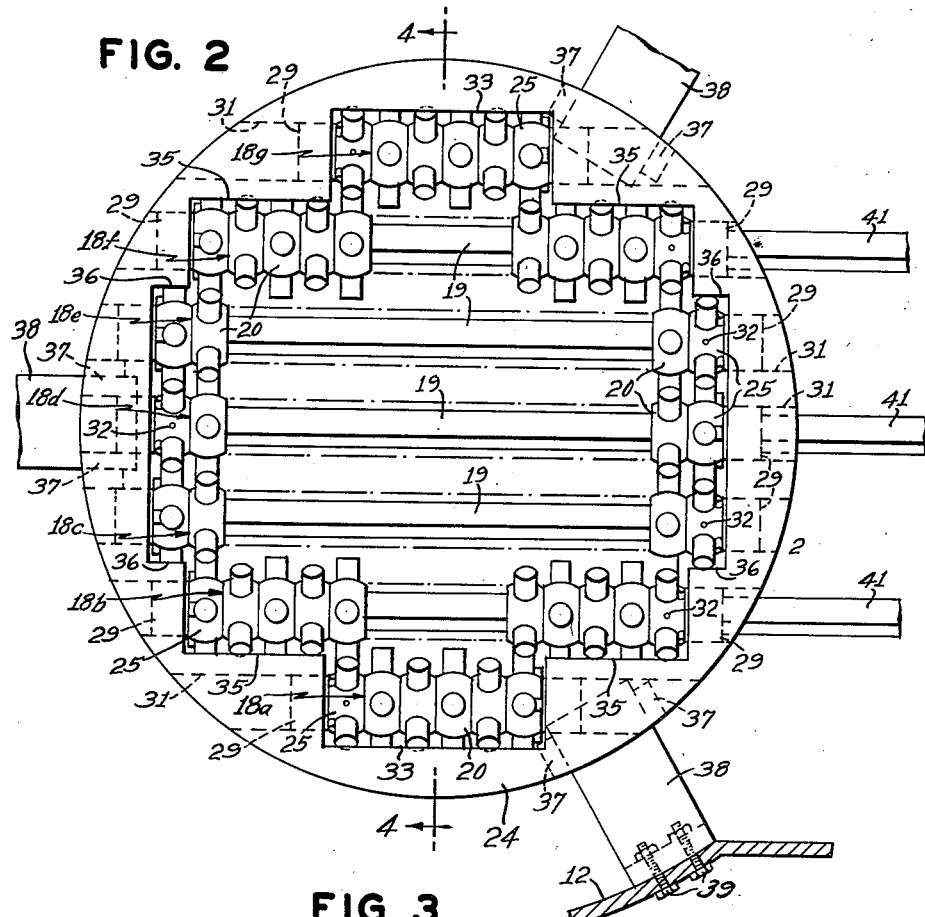
Fig. 2 is a plan of the grate incorporated in the furnace of Fig. 1, viewed as indicated by the line 2—2 of Fig. 1.
Figure 3:
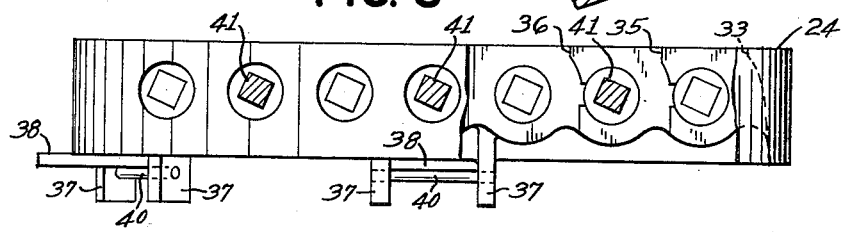
Fig. 3 is an elevation, partially in section, of the frame of the grate shown in Fig. 2.
Figure 4:
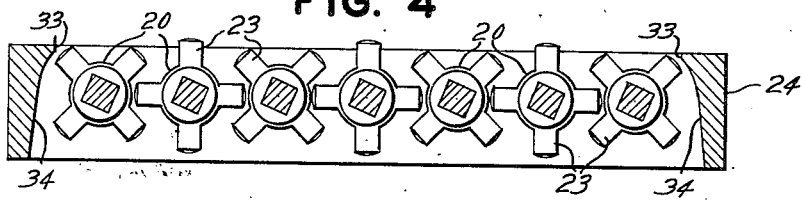
Fig. 4 is a section taken substantially along the line 4—4 of Fig. 2.

The construction of the grate 11 is best shown in Figs. 2 to 4. It comprises a series of grate bars 18a, 18b etc., each of which in turn comprises a square supporting shaft 19 carrying a string of individual grate segments 20. (For the sake of clarity, a detailed showing of grate segments 20 in the central area of the grate of Fig. 2 has been omitted, but of course this entire area is occupied by grate segments in a completed grate assembly—as is evident from the showing of the grate 11 in Fig. 1.)

Figure 5:
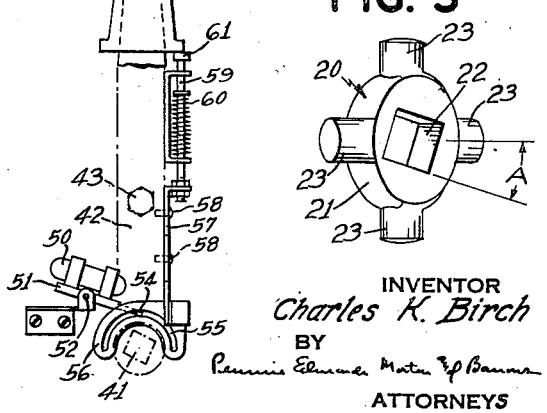
Fig. 5 is a perspective of one of the individual grate segments.

The individual grate segments 20 are all alike, and one of them is shown on an enlarged scale and in perspective in Fig. 5. Each such segment comprises a hub 21 having therein a square axial opening 22 of the proper size to receive the grate bar 19 on which it is supported. A plurality of short angularly spaced fingers 23 project radially from the hub 21. Four such fingers are shown on each of the grate segments portrayed in the drawings.

The sides of the rectangular opening 22 are at an angle A of 22½ degrees to the axial center lines through diametrically opposite pairs of fingers 23. Accordingly the angular position of any grate segment on its supporting shaft may be the same as, or displaced 45 degrees from, the angular position of any other grate segment on the same shaft, depending on whether one side or the other of the first such segment faces toward the other such segment. As shown in Fig. 2, the string of grate segments on each shaft are preferably arranged so that each segment is angularly staggered 45 degrees with respect to the segments on either side of it.

The grate bars 18a, 18b, etc. (each comprising a string of grate segments 20 on a supporting shaft 19), are supported in spaced parallel relation in a peripheral frame 24 (Figs. 2 to 4). The spacing of the grate bars in a supporting frame 24 is such that the fingers 23 on the segments of each such bar extend into the angular spaces between the fingers on the segments of each neighboring grate bar, as best shown in Fig. 4. Thus the segments of neighboring bars intermesh similarly to gears.

Figure 6:
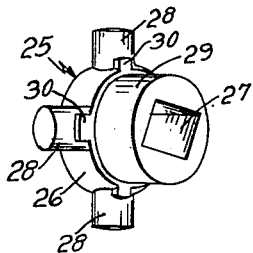
Fig. 6 is a perspective of one of the end grate segments by which the grate bars are journaled in the frame.

Owing to the square cross section of the bars 19 and the openings 22 in the grate segments, the string of segments forming a single bar are non-rotatable with respect to each other and with respect to their supporting shaft. The bars as a whole, however, are rotatably mounted in the frame 24. For this purpose a journaling grate segment 25 is provided at each end of each grate bar 18a, 18b, etc. Fig. 6 shows one of the journaling grate segments 25 in perspective. Like the other segments 20, it comprises basically a hub 26 having a square opening 27 extending axially therethrough to receive a grate shaft 19, and a plurality of short angularly spaced radial fingers 28 (shown in the drawings as being four in number, the same as the other grate segments 20). The journaling segments 25 are characterized by the provision of a cylindrical journal 29 projecting axially from one face of the hub 26, and by the provision of a plurality of radially extending thrust bearing blocks 30 extending outwardly from the journal with their exposed faces in the plane of the face of the segment hub from which the journal 29 projects. These bearing blocks 30 (which serve as axial thrust bearing surfaces) are positioned in front of the fingers 28 and are reinforced thereby.

The sides of the square axial hole 27 through each grate segment 25 are at an angle of 22½ degrees with respect to the axial center lines through diametrically opposite fingers 28. This is so that the end segments 25 may be aligned correctly with the segments 20. However, since the journal 29 projects from one side only of the hub 26, the end segments 25 are unsymmetrical, so it is sometimes necessary to prepare these end segments in both right-hand and left-hand versions (differing from each other by the direction in which the sides of the rectangular opening 27 are displaced through the angle of 22½ degrees from the axial center lines through the fingers 28). This is necessary for any grate bar in which the fingers of the two end segments are to be in angular alignment with each other, but is not necessary for any grate bar in which the fingers of the end segments are 45 degrees out of angular alignment with each other.

Both the end grate segments 25 and the intermediate grate segments 20 are advantageously made as castings, so that hub and fingers (together with journal and thrust bearing blocks in the case of the end segments 25) are all integral.

In the assembled grate, as shown in Fig. 2, the journals 29 of the end grate segments 25 extend into corresponding cylindrical bearing openings 31 formed in the frame 24. Thus each grate bar is journaled for rotation in the frame. Advantageously a radial hole is drilled through the hub of at least one of the end segments 25 on each grate bar and through its supporting shaft 19, and a pin 32 is driven therein, so that the shaft 19 cannot accidentally be withdrawn.

As best shown in Figs. 3 and 4, the upper surface of the frame 24 lies in a plane coinciding substantially with the general level of the upper surface of the active grate area (i. e., the area occupied by the grate segments 20 and 25). The upper surface of the frame where it is adjacent the side edge grate bars, for example at 33 in Figs. 2 and 4 where it is adjacent the side edge grate bars 18a and 18g, extends inwardly enough toward these grate bars so as to partially overlie them. For this purpose, the inner surfaces 34 (Figs. 3 and 4) of the side edge portions of the frame are advantageously curved concavely on a radius not much greater than that of the arc swept by the ends of the grate segment fingers 23 when the grate bars are rotated in their journal bearings. This arrangement serves to prevent coarse ash and clinkers from falling around the edges of the active area of the grate defined by the array of grate segments. In a grate for a circular furnace as shown in Figs. 2 to 4, where the inner surface of the side edges of the frame must assume a step-like configuration, the upper surface of the frame likewise partially overlies the outer side edges of the grate bars 18b and 18f at 35, and of the grate bars 18c and 18e at 36.

The under surface of the frame 24 is provided with a number of pairs of downwardly projecting lugs 37 (three such pairs are shown in Fig. 2). The grate assembly is supported in place in the furnace on brackets 38 which are fastened by bolts 39 to the furnace base 12, and which extends inwardly to support the frame at its bottom surface between the lugs 37. Pins 40 (Fig. 3) extending through each pair of lugs beneath the brackets 38 prevent tilting of the grate on the brackets.

Figure 7:
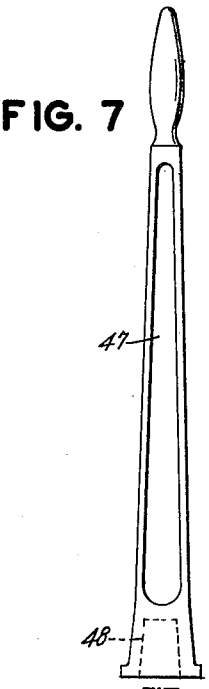
Fig. 7 is an elevation of the grate shaking lever assembly with the shaking handle in position to be placed thereon.

End portions 41 of alternate grate bar shafts 19 (on which the grate bars 18b, 18d and 18f of Fig. 2 are supported) project sufficiently beyond the grate frame 24 so as to extend through the front portion 14 of the furnace base, as best shown in Fig. 1. These projecting ends 41 provide for shaking the grate. To this end, each of these projecting portions of the grate bar shafts is fitted with a lever 42 (Figs. 1 and 7). These levers are all joined by pivot bolts 43 to a cross link 44, so that if oscillatory motion is imparted in any one of the levers 42, the same motion is directly transmitted to the others. One of the levers 42 is provided with an upwardly extending portion 45 having an inwardly tapered head 46 on which a grate shaking handle 47 may be detachably mounted. The grate shaking handle 47 is provided at its lower end with a tapered socket 48 adapted to fit securely on the tapered head 46.

When the handle is mounted in place and moved back and forth through an angle of say 45 degrees, each of the grate bars 18b, 18d and 18f of Fig. 2 are subjected directly to oscillatory motion. At the same time, the remaining grate bars are indirectly caused to oscillate because of the intermeshing of the fingers of the grate segments. Thus back and forth motion of the handle 47 imparts an oscillatory motion to all of the grate bars.

It is apparent from the foregoing that for ash or clinkers to pass through the grate, they must find their way between the intermeshed fingers of the grate segments. Coarse ash particles and clinkers become broken up and crushed when caught between the fingers, and so are reduced to a size suitable for handling in a vacuum ash removal system before being discharged through the grate. Because of the way in which the grate frame overlies the side edge grate bars at 33, 35 and 36, coarse ash and clinkrs are prevented from passing around the sides of the grate bars.

Figure 8:
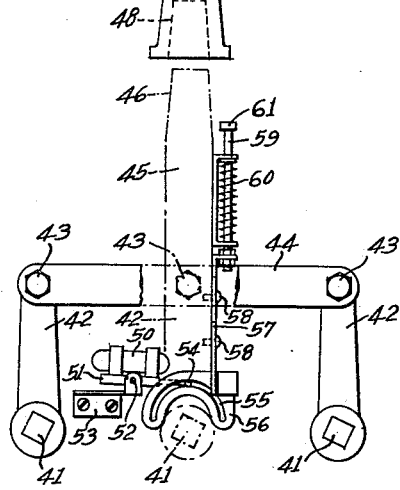
Fig. 8 is a fragmentary view of the shaking lever assembly with the shaking handle mounted thereon.

Figs. 7 and 8 show a tilting mercury switch 50 which is arranged to be closed whenever the grate shaking handle 47 is mounted on the lever extension 45. This switch and its operating mechanism is described in my aforesaid copending application Serial No. 82,341, and is for the purpose of setting a vacuum ash removal system in operation automatically whenever the furnace grate is shaken. The switch 50 is supported on a tiltable table 51 which is mounted by a pivot pin 52 on a bracket 53. Extending from the table is an arm from which a pin 54 projects into an arcuate slot 55 formed in a plate 56. This plate is attached to a mounting arm 57 which is fastened by two bolts 58 to the central grate shaking lever 42. The bolts 58 pass through vertical slots formed in the mounting arm, so that the arm and the plate 56 can move vertically through whatever distance is required to tilt the switch 50 from its open to its closed position. A rod 59 fastened at its lower end to the arm 57 is normally urged upwards by a compression spring 60 to a position such that the switch 50 is held open. When, however, the handle 47 is mounted in place on the lever extension 45, the base of the handle engages the head 61 of the rod 59, forcing it against the spring to its lower limit of travel with the result that the switch 50 is tilted to its closed position. The arcuate slot 55 is formed on a radius of curvature having its center (when the switch 50 is tilted to the closed position) coincident with the axis of rotation of the grate bar shaft to which the central shaking lever 42 is attached, so that shaking of the grate does not move the switch 50 from its closed position. It is evident that the switch can be connected to the operating motor of a vacuum ash removal system in such manner that the system is set in operation whenever the grate shaking handle 47 is mounted in place to shake the grate, and so that the ash removal system ceases operation at the completion of the grate shaking operation when the handle 47 is removed again.

Figure 9:
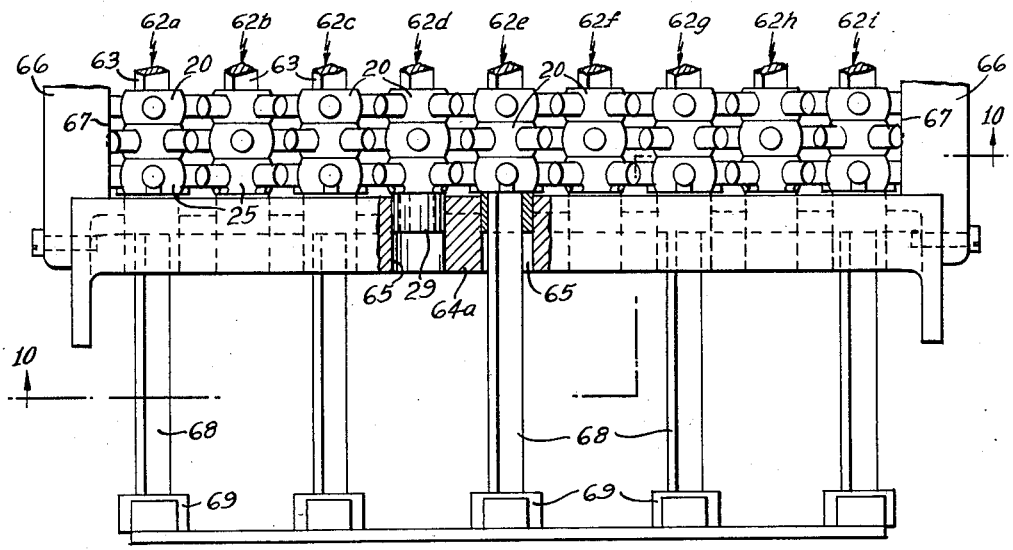
Fig. 9 is a plan of a grate assembly for a rectangular furnace.
Figure 10:
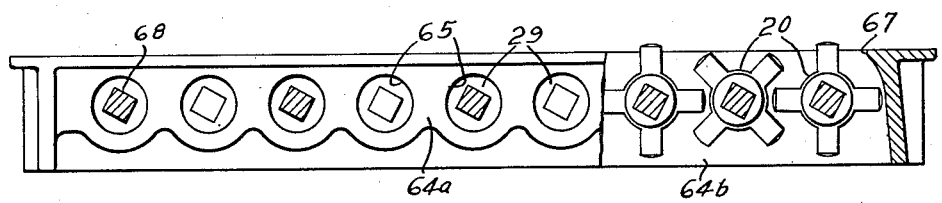
Fig. 10 is an elevation, partially in section, of the grate shown in Fig. 9, taken substantially along the line 10—10 of Fig. 9.
Figure 11:
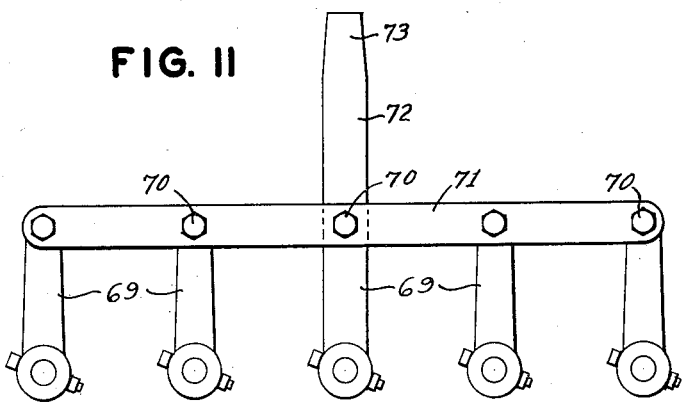
Fig. 11 is an elevation of the shaking lever assembly of the grate shown in Fig. 9.

Figs. 9 to 11 show a modification of the grate assembly described above, for use in a furnace of rectangular plan. The principal difference between the grate shown in Figs. 9 to 11 and that described above is in the design of the supporting frame. The grate itself comprises a plurality of grate bars 62a, 62b, etc., each comprising strings of grate segments 20 supported on square grate shafts 63. At each end of each string of grate segments is a journaling grate segment 25. The grate segments 20 and 25 are of course of the forms shown in Figs. 5 and 6.

The frame in which the grate is supported comprises front and rear frame members 64a and 64b respectively formed with cylindrical bearing openings 65 of the correct size to receive the journals 29 of the end segments of each grate bar, and so spaced that the fingers on the grate segments of any one grate bar extend into the angular spaces between the fingers on the segments of the neighboring bars. Side frame members 66 which are bolted to the front and rear frame members 64 complete the rectangular frame surrounding the active grate area defined by the array of grate segments. The upper surface of the side frame members 66 extend inwardly at 67 to overlie partially the side grate bars 62a and 62i, thereby to prevent the coarse ash and clinkers from dropping around the side edges of the grate.

The grate shafts of alternate grate bars 62a, 62c, 62e, 62g and 62i have their front end portions 68 projecting an appreciable distance beyond the front frame member 64a. Grate shaking levers 69 are secured to each of these projecting shafts, and these levers are pivotally connected by pivot bolts 70 to a connecting link 71. One of the levers 69 (advantageously the central one) includes a vertical extension 72 formed with an inwardly tapered head 73 for receiving a grate shaking handle. Shaking of the grate is accomplished in the same manner and proceeds in the same fashion as described above with reference to the circular grate.

The design of the new ash crushing grate is such that it may be installed in an existing furnace as a replacement for a conventional grate, or of course it may be included as original equipment in a new furnace. It is of rugged construction, well able to withstand severe usage. It has been found to exert exceptionally efficient crushing action on even rather hard clinkers, and to insure sufficient comminution of coarse ash and clinkers which pass through it so that the resulting ash and clinker particles are all small enough to be handled without clogging in a vacuum ash removal system.

I claim:

1. An ash crushing grate assembly comprising a plurality of grate bars mounted side by side for oscillatory motion, each grate bar comprising a string of individual grate segments non-rotatably mounted on a supporting shaft, and each grate segment comprising a hub having an axial opening therethrough for receiving said shaft and a plurality of angularly spaced short fingers projecting radially from said hub, said grate bars being mounted with the fingers of the grate segments thereon projecting into the angular spaces between the fingers of the segments of each laterally adjacent grate bar to substantially the full depth thereof, and means for oscillating alternate grate bars only, whereby when said alternate grate bars are oscillated the projecting fingers of the grate segments carried thereby will move towards the projecting fingers of grate segments of an adjacent grate bar and tend to crush material between the fingers of the respective grate segments and finally impart an oscillatory movement to said adjacent grate bar through the projecting fingers of the grate segments thereof.

2. An ash crushing grate assembly comprising a supporting frame, a plurality of spaced parallel grate shafts journaled in said frame, the ends of alternate shafts projecting outwardly beyond the frame, a string of grate segments non-rotatably supported on each shaft, each of said segments comprising a hub having an axial opening through which its supporting shaft extends and a plurality of angularly spaced short radial fingers projecting from said hub, the spacing between the shafts being sufficiently close so that the fingers of the segments on each shaft intermesh in and project substantially to the bottom of the angular spaces between the fingers of the laterally adjacent segments on the neighboring shafts, and an arrangement of interlinked grate shaking levers secured to the projecting ends of said alternate shafts only.

3. An ash crushing grate comprising an array of spaced substantially parallel grate shafts each carrying a string of grate segments having a plurality of angularly spaced radially projecting fingers, the spacing between said shafts being sufficiently close so that the fingers of the segments carried by each shaft extend into the spaces between the fingers of the segments on the neighboring shafts substantially to the full depth thereof, the ends of alternate shafts projecting beyond the grate area defined by such intermeshed segments, a grate shaking lever secured to the projecting end of each of said alternate shafts only, and a link pivotally connecting said levers together, whereby the segments on said alternate shafts are oscillated directly when oscillatory movement is imparted to any of said levers and the segments on the intervening shafts are then oscillated indirectly by virtue of the intermeshing of their fingers with those of the segments on said alternate shafts.

References Cited in the file of this patent

UNITED STATES PATENTS

| 42,526 | Brown | Apr. 26, 1864 |
| 120,459 | Rogers | Oct. 31, 1871 |
| 338,305 | Scheef | Mar. 23, 1886 |
| 423,721 | Beers | Mar. 18, 1890 |
| 740,153 | Lyne | Sept. 29, 1903 |
| 1,248,048 | Woolson | Nov. 27, 1917 |
| 1,598,364 | Cassell et al. | Aug. 31, 1926 |
| 1,883,578 | Cody et al. | Oct. 18, 1932 |

FOREIGN PATENTS

| 8,537 | Great Britain | Dec. 14, 1911 |